United States Patent [19]
Tang et al.

[11] Patent Number: 5,869,582
[45] Date of Patent: Feb. 9, 1999

[54] DIBLOCK POLYESTER COPOLYMER AND PROCESS FOR MAKING

[75] Inventors: Weiming Tang, Hiawatha; Frank Mares, Whippany; Robert Clark Morgan, Summit, all of N.J.

[73] Assignee: AlliedSignal Inc., Morristownship, N.J.

[21] Appl. No.: 819,066

[22] Filed: Mar. 18, 1997

Related U.S. Application Data

[63] Continuation-in-part of Ser. No. 788,895, Jan. 22, 1997.
[51] Int. Cl.$^6$ ............................ B60R 22/00; A62B 35/00
[52] U.S. Cl. ...................... 525/415; 428/224; 428/225; 428/232; 525/411; 525/437
[58] Field of Search .................................... 525/437, 415, 525/411; 428/224, 225, 232

[56] References Cited

U.S. PATENT DOCUMENTS

| | | |
|---|---|---|
| 3,408,433 | 10/1968 | Brayford . |
| 3,671,620 | 6/1972 | Inoue . |
| 3,914,502 | 10/1975 | Hayashi et al. . |
| 3,927,167 | 12/1975 | Reese . |
| 3,957,905 | 5/1976 | Sumoto et al. ........................ 260/860 |
| 4,045,401 | 8/1977 | Stenmark et al. .................... 260/42.18 |
| 4,110,411 | 8/1978 | Imanaka et al. . |
| 4,500,686 | 2/1985 | Kobayashi et al. ...................... 525/408 |
| 4,584,353 | 4/1986 | Kobayashi et al. ...................... 525/438 |
| 4,670,498 | 6/1987 | Furusawa et al. ...................... 524/381 |
| 4,670,510 | 6/1987 | Kobayashi et al. ........................ 525/89 |
| 4,680,345 | 7/1987 | Kobayashi et al. . |
| 4,694,049 | 9/1987 | Morita et al. . |
| 4,710,423 | 12/1987 | Imamura . |
| 4,942,219 | 7/1990 | Yatsuka et al. . |
| 4,945,191 | 7/1990 | Satsuka et al. . |
| 5,225,497 | 7/1993 | Ishii . |
| 5,439,985 | 8/1995 | Gross et al. ............................ 525/411 |
| 5,646,077 | 7/1997 | Matsunaga et al. .................... 442/415 |
| 5,656,700 | 8/1997 | Kagi et al. ............................. 525/437 |
| 5,716,568 | 2/1998 | Kaigi et al. . |

FOREIGN PATENT DOCUMENTS

| | | |
|---|---|---|
| 19513259 | 10/1996 | Germany . |
| 4115 | 2/1973 | Japan . |
| 4116 | 2/1973 | Japan . |
| 49037 | 12/1977 | Japan . |

(List continued on next page.)

OTHER PUBLICATIONS

International Search Report dated Apr. 17, 1998.
*Journal of Polymer Science 12*, (1974) "Viscosity–Molecular Weight Relationship for Fractionated Poly(ehtylene Terephthalate)", by William L. Hergenrother & Charles J. Nelson, pp. 2905–2915.
*Textile Research Journal 66(11)*, (1996) "Effects of Molecular Weight on melt Spinning an Mechanical Properties of High Performance Poly(ethylene Terephthalate) Fibers", by Andrzej Ziabicki, pp. 705–712.

(List continued on next page.)

*Primary Examiner*—Robert H. Harrison
*Attorney, Agent, or Firm*—Melanie L. Brown; Virginia S. Andrews

[57] ABSTRACT

The present invention provides a diblock copolymer comprising: (a) a first block of polyester wherein said first block is made from aromatic polyester having: (i) an intrinsic viscosity which is measured in a 60/40 by weight mixture of phenol and tetrachloroethane and is at least about 0.6 deciliter/gram and (ii) a Newtonian melt viscosity which is measured by capillary rheometer and is at least about 7,000 poise at 280° C.; and (b) a second block of polyester wherein said second block is made from lactone monomer. The diblock copolymer is useful in engineered materials, films, and in spinning fibers for industrial applications such as seat belts. A process for making the diblock copolymer uses a twin screw extruder for melting the aromatic polyester and mixing it with monomer.

18 Claims, 8 Drawing Sheets

FOREIGN PATENT DOCUMENTS

| | | |
|---|---|---|
| 116853 | 9/1980 | Japan . |
| 157117 | 9/1984 | Japan . |
| 60031525 | 2/1985 | Japan . |
| 2097519 | 4/1990 | Japan . |
| 2097520 | 4/1990 | Japan . |
| 2099554 | 4/1990 | Japan . |
| 2099555 | 4/1990 | Japan . |
| 279416 | 10/1991 | Japan . |
| 27268 | 5/1992 | Japan . |
| 253764 | 9/1992 | Japan . |
| 26456 | 9/1992 | Japan . |
| 275326 | 9/1992 | Japan . |
| 43781 | 2/1993 | Japan . |
| 5059192 | 3/1993 | Japan . |
| 59192 | 3/1993 | Japan . |
| 116263 | 5/1993 | Japan . |
| 155996 | 6/1993 | Japan . |
| 5302 | 8/1993 | Japan . |
| 302022 | 11/1993 | Japan . |
| 6172507 | 6/1994 | Japan . |
| 257062 | 9/1994 | Japan . |

OTHER PUBLICATIONS

*Journal of Applied Polymer Science 22* (1978) "Molecular Weight–Viscosity Relationships for Poly(1,4–butylene Terephthalate)", by W.F.H. Borman, pp. 2119–2126.

Principles of Polymer Chemistry by Paul J. Flory, (1953) pp. 308–310.

Textile Research Institute, "Identifying Critical Process Variables in Poly(ethylene Terephthalate Melt Spinning", by A. Dutta & V. Nadkarni, (Jan. 1984) pp. 35–42.

DIBLOCK POLYESTER COPOLYMER AND PROCESS FOR MAKING

This application is a continuation-in-part patent application of copending Ser. No. 08/788,895 filed Jan. 22, 1997.

BACKGROUND OF THE INVENTION

Known copolymers comprising aromatic polyester and lactone therein are limited to those formed from aromatic polyester having intrinsic viscosities ("IV") which are low and melt viscosities ("MV") which are low. Japanese Patent Publication 4115 published Feb. 5, 1973 ("Publication 4115") teaches the use of aromatic polyesters such as poly(ethylene terephthalate) ("PET") and poly(butylene terephthalate) ("PBT"). Publication 4115 has Examples illustrating PET's use in a copolymer wherein the PET has a number average molecular weight ("$M_n$") of 500–5,000 which corresponds to an IV of less than 0.3 as measured in a 60/40 by weight mixture of phenol and tetrachloroethane solvents according to William L. Hergenrother and Charles Jay Nelson, "Viscosity-Molecular Weight Relationship for Fractionated Poly(ethylene Terephthalate)", *Journal of Polymer Science* 12, 2905–2915 (1974). These low $M_n$ and low IV PETs also have low melt viscosities, i.e., less than 100 poises at 280° C., according to Andrzej Ziabicki, "Effects of Molecular Weight on Melt Spinning and Mechanical Properties of High-Performance Poly(ethylene Terephthalate) Fibers", *Textile Res. J.* 66(11), 705–712 (1996). The Ziabicki article uses data from A. Dutta, "Identifying Critical Process Variables in Poly(ethylene Terephthalate) Melt Spinning", *Textile Res. J.* 54, 35–42 (1984) which teaches that rheological studies of the shear viscosity of PET indicate that PET behaves like a Newtonian liquid for shear rates up to about 200/seconds. Publication 4115 teaches that even when using such low IV and MV PET, at least 50 weight percent ε-caprolactone is still required in order to plasticize PET melt and then mix with PET.

Publication 4115 also has an Example illustrating PBT's use in a copolymer wherein the PBT has a $M_n$ of 1,200 which corresponds to an IV of less than 0.1 as measured in a 60/40 by weight mixture of phenol and tetrachloroethane solvents according to W. F. H. Borman, "Molecular Weight-Viscosity Relationships for Poly(1,4-butylene Terephthalate)", *Journal of Applied Polymer Science* 22, 2119–2126 (1978). This low $M_n$ and low IV PBT also has a low melt viscosity, i.e., less than 10 poises at 250° C., according to the Borman article and the melt viscosity of PBT is Newtonian at low shear stress, i.e. shear rates equal to or less than 100/seconds.

Publication 4115 also teaches an initial reaction between both ends of an aromatic polyester, P, with ε-caprolactone, L, and then reacting the oligomeric L-P-L with a polyfunctional acylation agent, A to form multiblock copolymer -L-P-L-A-L-P-L-A-L-P-L- in order to extend the chain and obtain high molecular weight polymers which are suitable for use as thermoplastic elastomers. Publication 4115 teaches that the use of a polyfunctional acylation agent results in the preceding regular repeating structure.

Known process for making the foregoing copolymers involve the use of an autoclave or reactor with a stirrer and a nitrogen atmosphere by reaction of oligomeric polyester with ε-caprolactone at reaction times of at least two hours. Japanese Patent Publication 4116 published Feb. 5, 1973 ("Publication 4116") and Kokai Patent Publication 157117 published Sep. 6, 1984 ("Publication "157117") teach Example reaction times of 2–5 hours. The inventors of Japanese Patent Publication 49037 published Dec. 14, 1977 ("Publication 49037") acknowledge that its prior process, as disclosed in Publication 4116, results in ester interaction between the aromatic polyester and polycaprolactone blocks and thus, the copolymer's block length was short and the copolymer melting point was low. Publication 49037 teaches that to overcome the preceding problem, that the reaction temperature needs to remain below the aromatic polyester's melting point, i.e. solid state polymerization, so that the aromatic polyester powder remains in a solid state throughout the reaction; unfortunately, as a result, each Example teaches a very long reaction time of 24 hours.

Example 1 of Publication 4116 teaches that at least 50 weight percent ε-caprolactone is required in order to plasticize higher IV PET ($M_n$=20,400; IV≦0.67) and then mix with it. Example 5 of Publication 4116 teaches that at least 50 weight percent caprolactone is required in order to plasticize higher IV PBT ($M_n$=10,500; IV≦0.4) and then mix with it. These extensive mixing results in increased transesterification.

The inventors of Japanese Patent Publication 27268 published May 11, 1992 ("Publication 27268"); Kokai Patent Publication 57302 published Aug. 23, 1993 ("Publication 57302"); Kokai Patent Publication 253764 published Sep. 9, 1992 ("Publication 253764"); Kokai Patent Publication 264156 published Sep. 18, 1992 ("Publication 264156"); and U.S. Pat. Nos. 4,584,353 and 4,670,510 recognized the deficiencies in the processes of Publications 4115, 4116, and 49037 by stating that the obtained viscosity was low and thus, the applications were limited.

Publications 27268 and 57302 and U.S. Pat. Nos. 4,500, 686; 4,584,353; 4,670,510; and 4,670,948 teach that a block copolymer of PBT and polycaprolactone may be formed according to Publication 4116, i.e, the block copolymer was formed in a reaction vessel under nitrogen gas and stirring at 230° C. for 2 hours. The unreacted ε-caprolactone was removed from the melt and the block copolymer was then mixed with additional PBT and epoxy at room temperature and then the mixture was extruded at 230° C. to form multiblock copolymers. Pre-mixing PBT and ε-caprolactone in long reaction times results in increased transesterification which is unacceptable. They also teach that the block copolymer must be mixed with pure PBT in order to achieve desired mechanical properties.

A catalyst may be used in the foregoing reaction of PBT and ε-caprolactone in a stirrer apparatus as taught by Publications 253764 and 264156 wherein the catalyst was monobutyl monohydroxy tin oxide and the reaction time was 30 minutes. These publications also teach blending epoxy and 5-valenced phosphorus compound with the oligomeric copolymer in order to improve the molecular weight.

Because known oligomeric copolymers are made from starting aromatic polyesters having low IV and MV, known oligomeric copolymers have low IV and MV. Known oligomeric copolymers and resulting multiblock copolymers also have short block lengths and high transesterification because the processes for making them have a long residence time. As a result, fibers which are spun from the foregoing copolymers are undesirable because the fibers have low crystallinity, low melting points, low ultimate tensile strength, and undesired stress/strain behavior.

It would be desirable to have a diblock copolymer wherein the starting aromatic polyester has a high IV, the copolymer block length is long, the transesterification degree is low, the reaction time for making the copolymer is short (minutes instead of hours), and the use of a polyfunctional acylation agent is not required to extend the chain. We tried to accomplish the foregoing by using a reactor with a stirrer to make a diblock copolymer from starting aromatic polyester having a higher IV and melt viscosity than that taught in the prior art but this attempt was unsuccessful as described below in the Comparative Example because an autoclave does not allow mixing between high IV PET and ε-caprolactone wherein the amount of ε-caprolactone is less than 50 percent by weight based on the diblock copolymer weight.

SUMMARY OF THE INVENTION

We have developed a diblock copolymer which responds to the foregoing need in the art. The diblock copolymer comprises:

(a) a first block of polyester wherein said first block is made from aromatic polyester having: (i) an intrinsic viscosity which is measured in a 60/40 by weight mixture of phenol and tetrachloroethane and is at least about 0.6 deciliter/gram and (ii) a Newtonian melt viscosity which is measured by capillary rheometer and is at least about 7,000 poise at 280° C.; and (b) a second block of polyester wherein said second block is made from lactone monomer. The term "diblock copolymer" as used herein means an aromatic polyester ("P1") and a lactone polymer ("P2") as follows: P1-P2.

We have also developed a process for making the diblock copolymer. The present process for forming a diblock copolymer comprising: (a) a first block of polyester wherein said first block is made from aromatic polyester having: (i) an intrinsic viscosity which is measured in a 60/40 by weight mixture of phenol and tetrachloroethane and is at least about 0.6 deciliter/gram and (ii) a Newtonian melt viscosity which is measured by capillary rheometer and is at least about 7,000 poise at 280° C. block; and (b) a second block of polyester wherein said second block is made from lactone monomer, comprises the steps of: (A) in an extruder, injecting lactone monomer and optionally catalyst into the aromatic polyester which is melted; and (B) mixing the melted aromatic polyester and the lactone monomer at a brief residence time and at a temperature sufficient to form the diblock copolymer, wherein the amount of transesterification is less than about 5 percent by weight based on the diblock copolymer weight. Most preferably, the reaction time is less than about 5 minutes.

The term "transesterification" or "scrambling" as used herein means that an ester exchange occurs between the aromatic polyester and the lactone monomer and as a result, an aromatic polyester unit may occur within the lactone block or a lactone unit may occur within the aromatic polyester.

The present diblock copolymer has the following advantages. The present diblock copolymer is made from an aromatic polyester with high IV and MV. The present process is also advantageous because the lower residence time results in diblock copolymer with less than about 5 percent by weight transesterified or scrambled block copolymer based on the diblock copolymer weight and also has long block lengths and thus, high melting points. Thus, spinning fiber from the present diblock copolymer results in an increased crystallization rate and improved fiber spinning. Also, the diblock copolymers have high molecular weight and thus, the need for subsequent chain extension of the prior art copolymers is obviated with the present invention and fibers which are spun from the present diblock copolymers have increased ultimate tensile strength and desired stress/strain curves.

The present diblock copolymers may be used in known engineered materials or formed into film or fiber.

Other advantages of the present invention will be apparent from the following description, attached drawings, and attached claims.

DETAILED DESCRIPTION OF THE PREFERRED EMBODIMENTS

Figure 1:
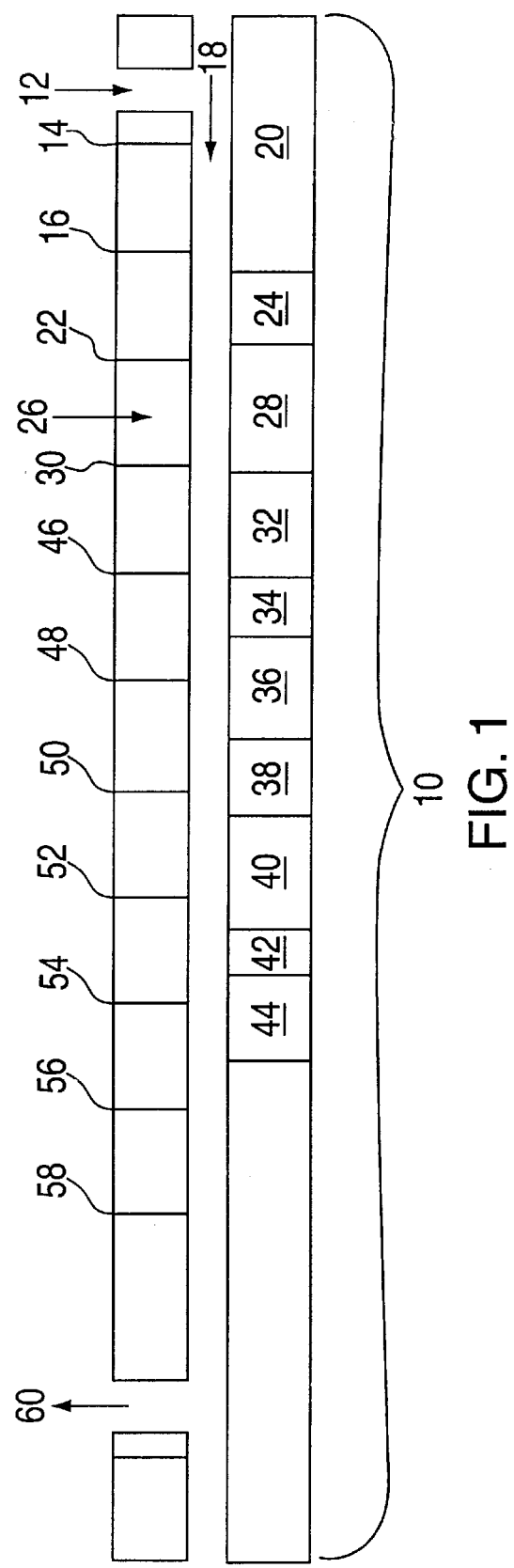
FIGS. 1–3 illustrate screw profiles of twin screw extruders which are useful in the present invention.

The term "aromatic polyester" as used herein means a polyester which has a cyclic structure with 6 or 10 pi electrons. The aromatic polyester has (i) an intrinsic viscosity which is measured in a 60/40 by weight mixture of phenol and tetrachloroethane and is at least about 0.6 deciliter/g and (ii) a Newtonian melt viscosity which is as measured by capillary rheometer and is at least about 7,000 poise at 280° C. Examples of preferred aromatic polyesters include poly tethylene terephthalate)("PET"), poly(ethylene naphthalate)("PEN"); poly(bis-hydroxymethylcyclohexene terephthalate); poly(bis-hydroxymethylcyclohexene naphthalate); other polyalkylene or polycycloalkylene naphthalates and the mixed polyesters which in addition to the ethylene terephthalate unit, contain components such as ethylene isophthalate, ethylene adipate, ethylene sebacate, 1,4-cyclohexylene dimethylene terephthalate, or other alkylene terephthalate units. A mixture of aromatic polyesters may also be used. Commercially available aromatic polyesters may be used. The more preferred aromatic polyester include PET and PEN. The intrinsic viscosities, as measured in a 60/40 by weight mixture of phenol and tetrachloroethane, of the preferred aromatic polyesters are about 0.8 for PET and about 0.6 for PEN. The more preferred IV for PET is 0.9 and for PEN is 0.7. The melting point of PET is about 250° C. and of PEN is about 266° C. The Newtonian melt viscosity for PET (with an IV=1) is about 16,400 poises at 280° C. and the Newtonian melt viscosity for PEN (with an IV=1) is greater than PET's Newtonian melt viscosity. Thus, the present aromatic polyester has a higher IV and MV than the prior art starting aromatic polyester used in the oligomeric copolymers.

Preferred lactones include ε-caprolactone, propiolactone, butyrolactone, valerolactone, and higher cyclic lactones. Two or more types of lactones may be used simultaneously.

Preferably, the amount of lactone polymer present in the diblock copolymer is about 1 to about 50 weight percent based on the diblock copolymer weight. When the diblock copolymer is intended for use as a seat belt fiber, the PET-polycaprolactone diblock copolymer has a polycaprolactone concentration of preferably about 15 to about 35 weight percent, more preferably about 20 to about 30 weight percent, and most preferably about 22 to about 27 weight percent based on the diblock copolymer weight.

Catalysts used in the polymerization of lactones may be used in the diblock copolymerization. Preferred catalysts are organometallics based on metals such as lithium, sodium, potassium, rubidium, cesium, magnesium, inorganic acid salts, oxides organic acid salts and alkoxides of calcium, barium, strontium, zinc, aluminum, titanium, cobalt, germanium, tin, lead, antimony, arsenic, cerium, boron cadmium and manganese; and their organometallic complexes. More preferred catalysts are organic acid salts and organometallic compounds of tin, aluminum and titanium. The most preferred catalysts are tin diacylate, tin tetra acylate, dibutyltin oxide, dibutyltin dilaurate, tin octanoate, tin tetra acetate, triisobutyl aluminum, tetra butyl titanium, germanium dioxide, antimony trioxide, porphyrin and phthalocyanine complexes of these metals. Two or more catalyst types may be used in parallel. Useful catalysts are commercially available.

Preferably, the amount of catalyst used is about 0.01 to about 0.2 weight percent based on the combined weight of the aromatic polyester and lactone monomer.

The aromatic polyester is added to an extruder. The aromatic polyester may be melted and then added to the extruder or the aromatic polyester may be added to the extruder and then melted in the extruder. We have found that the preferred extruder is a twin screw extruder wherein mixing and reaction of the polymeric melt with material having a drastic viscosity difference become feasible. Useful twin screw extruders are commercially available. The term "extruder" as used herein excludes the stirred reactors of the prior art.

Figure 2:
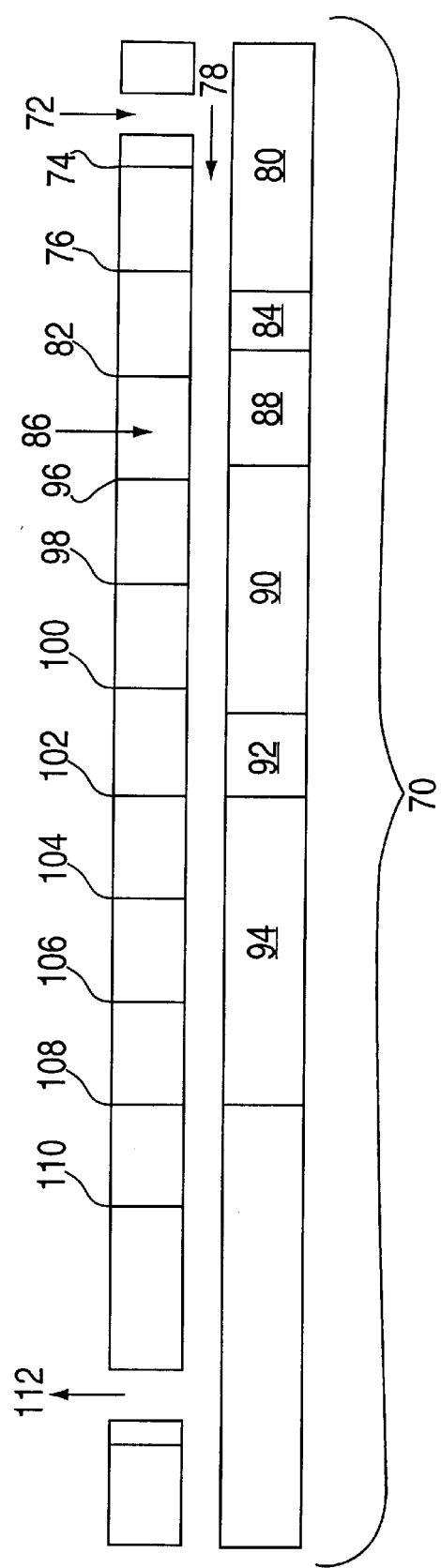
Figure 3:
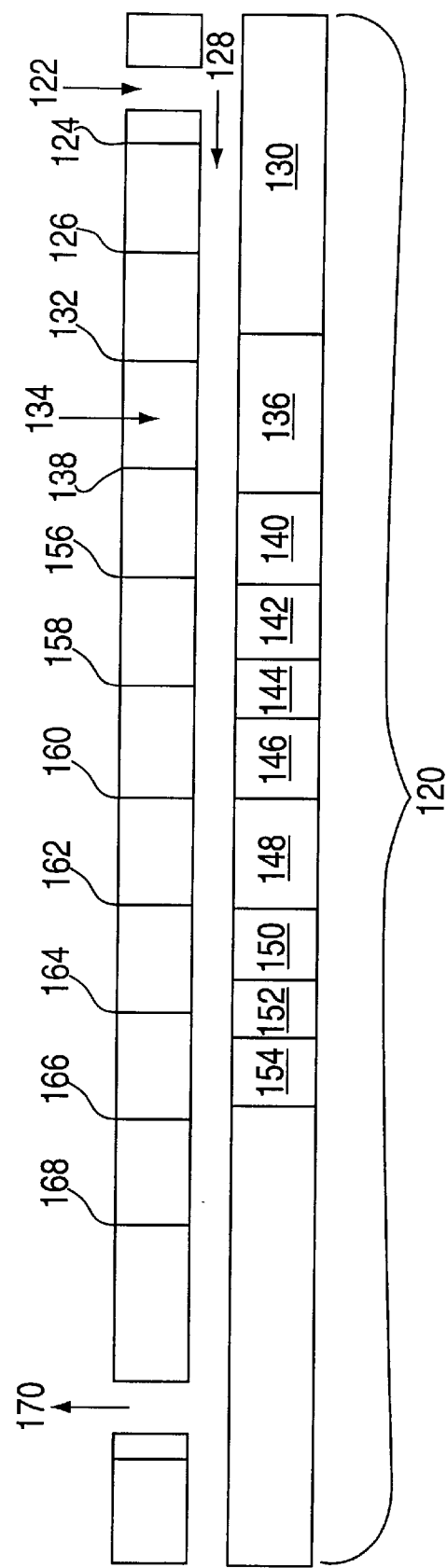

FIGS. 1 through 3 illustrate preferred twin screw extruder profiles. The counter-rotation twin screw extruders provide a counter intermeshing mode, and thus, in comparison with other extruders, provide good dispersive mixing, tight residence time distribution, and effective devolatilization. The screw profile is designed to allow polyester pellet feeding, polyester pellet melting, lactone monomer injection, mixing, reaction, devolatilization, and finally pelletization or spinning. The extruder design also allows feeding of the starting aromatic polyester melt. The most efficient dispersive and distributive mixing must occur at the position where the lactone monomer is injected into the polyester melt.

The initial extrusion temperature exceeds the melting point (as measured by Perkin-Elmer Differential Scanning Calorimeter (DSC) from the maxima of the endotherm resulting from scanning a 2 mg. sample at 20° C. per minute) of the aromatic polyester used. The melting points of the preferred aromatic polyesters are 250° C. for PET and 266° C. for PEN. The preferred initial extrusion zone temperature is at least about 30° C. above the aromatic polyester melting point. Thus, the preferred initial extrusion temperature for PET is at least about 280° C. while the preferred initial extrusion temperature for PEN is at least about 296° C. To promote the diblock copolymer formation and minimize transesterification occurrence, the residence time and extrusion temperature profile are important.

After the aromatic polyester is melted, the melt temperature is decreased preferably by at least about 20° C. and more preferably by at least about 50° C. due to mixing with the injected lactone monomer and catalyst. Preferably, the catalyst is added to the lactone monomer at room temperature and the lactone monomer/catalyst mixture is injected into the melted aromatic polyester. Thus, the reactive extrusion temperature for PET is preferably about 260° C. and more preferably about 230° to about 260° C. while the reactive extrusion temperature for PEN is preferably about 276° C. and more preferably about 246° to about 276° C.

The term "residence time" in the extruder as used herein means the extruder volume divided by the output rate. The aromatic polyester and lactone are extruded at a residence time of less than about 30 minutes and at a temperature sufficient to form the diblock copolymer. The preferred residence time is less than about 15 minutes. The more preferred residence time is less than about 10 minutes and the most preferred residence time is less than about 5 minutes. This short residence time contrasts sharply with the prior art reaction times as described above. This short residence time minimizes transesterification while ensuring complete polymerization which means to graft the $\epsilon$-caprolactone monomer to form the block at the PET chain end and complete consumption of the injected $\epsilon$-caprolactone monomer. Turbulators are used to increase extruder volume without sacrificing the throughput rate and to control the residence reaction time. To determine residence distribution, we added colored pellets which served as a marker to the polyester pellets. The term "distribution time" means the range starting from the color appearance and ending at color disappearance. As those skilled in the art know, as the distribution time decreases, product uniformity increases. Thus, the preferred distribution time is less than about 4 minutes. The distribution time is more preferably less than about 2 minutes and most preferably less than about 1 minutes.

In contrast to the process of Publications 27268 and 57302 and U.S. Pat. Nos. 4,500,686; 4,584,353; 4,670,510; and 4,670,948, the aromatic polyester and $\epsilon$-caprolactone monomer are not pre-mixed in a reactor before being added to the extruder. Also in contrast to Publications 157117, 27268, and U.S. Pat. Nos. 4,500,686; 4,584,353; 4,670,510; and 4,670,948, no lactone monomer remains unreacted in the present process.

The occurrence of an aromatic polyester unit in polycaprolactone is evidenced by a chemical shift at 4.7 ppm. The occurrence of a polycaprolactone unit in aromatic polyester is evidenced by a chemical shift at 4.5 ppm. The amount of transesterification is less than about 5 weight percent based on the diblock copolymer weight.

Although not wishing to be bound by theory, we believe that in the molten state, the aromatic polyester's hydroxyl group attacks the $\epsilon$-lactone's coordinated carbonyl at transitional state and cleaves the $\epsilon$-lactone's acyl-oxygen bond. Chain propagation of the lactone monomer occurs at the aromatic polyester's end to form the diblock copolymer.

The intrinsic viscosity of the diblock copolymer is higher than the intrinsic viscosity of the aromatic polyester and thus, this evidences the copolymerization of the aromatic polyester with the $\epsilon$-caprolactone monomer.

The diblock copolymer may be used in the known engineered materials or made into film by a known process or spun into fiber using a known process. The formation of PET/polycaprolactone fiber may be achieved by spinning either directly from twin screw extruder or separately from single screw extruder using PET/polycaprolactone pellets produced by the twin screw extruder. Both processes consisted of extrusion, spinning, drawing and relaxing stages.

Test Procedures:

In the following Examples, the reduced specific viscosity was determined as follows. Solution viscosity and solvent viscosity were measured and specific viscosity was calculated by (solution viscosity-solvent viscosity)/(solvent viscosity). Reduced specific viscosity is calculated from specific viscosity/solution concentration.

The intrinsic viscosity was determined by plotting the reduced specific viscosity versus solution concentration. The intercept was the intrinsic viscosity. It is understood that IV is expressed in units of deciliters per gram or (dl/g) herein even if such units are not indicated. A comparison of IV measurements in other solvents is taught by William L. Hergenrother and Charles Jay Nelson, "Viscosity-Molecular Weight Relationship for Fractionated Poly(ethylene Terephthalate)", *Journal of Polymer Science* 12, 2905–2915 (1974).

For the PET used in the present diblock copolymer, the Newtonian melt viscosity is obtained from low shear rate ranges, i.e. less than 100/seconds, and was determined for the Inventive Examples to be 15,000 poises based on the Ziabicki and Dutta references.

NMR was measured by dissolving 5 mg. of PET-polycaprolactone diblock copolymer in a 50/50 by volume mixture of deuterated chloroform and pentafluorophenol solvent and inserting the sample into a 400 MHz NMR spectrometer and obtaining the $^1$H NMR spectra.

Radial birefringence is done by measuring the radial structure through a correct measurement of refractive index profiles of fiber.

Tenacity is measured on an Instron equipped with two grips which hold the yarns at the gauge lengths of 10 inches. The yarn is then pulled by the strain rate of 10 inch/minute, the data are recorded by a load cell, and stress-strain curves are obtained. Tenacity is the breaking strength (in grams) divided by the yarn's denier.

X-ray diffraction was determined by taking two Philip's PW3710 Diffractometers with parafocus and transmission geometry using copper K-alpha radiation. The diffraction patterns were peakfitted with the Shadow program. The results of this program were used to calculate apparent crystallite sizes (ACS) and crystalline index (CI). Fast-rotational scan was done for determining the crystallinity. X-ray diffraction images were obtained using a Siemens area detector with cobalt K-alpha radiation. These images were used to calculate crystalline and amorphous orientation.

Figure 4:
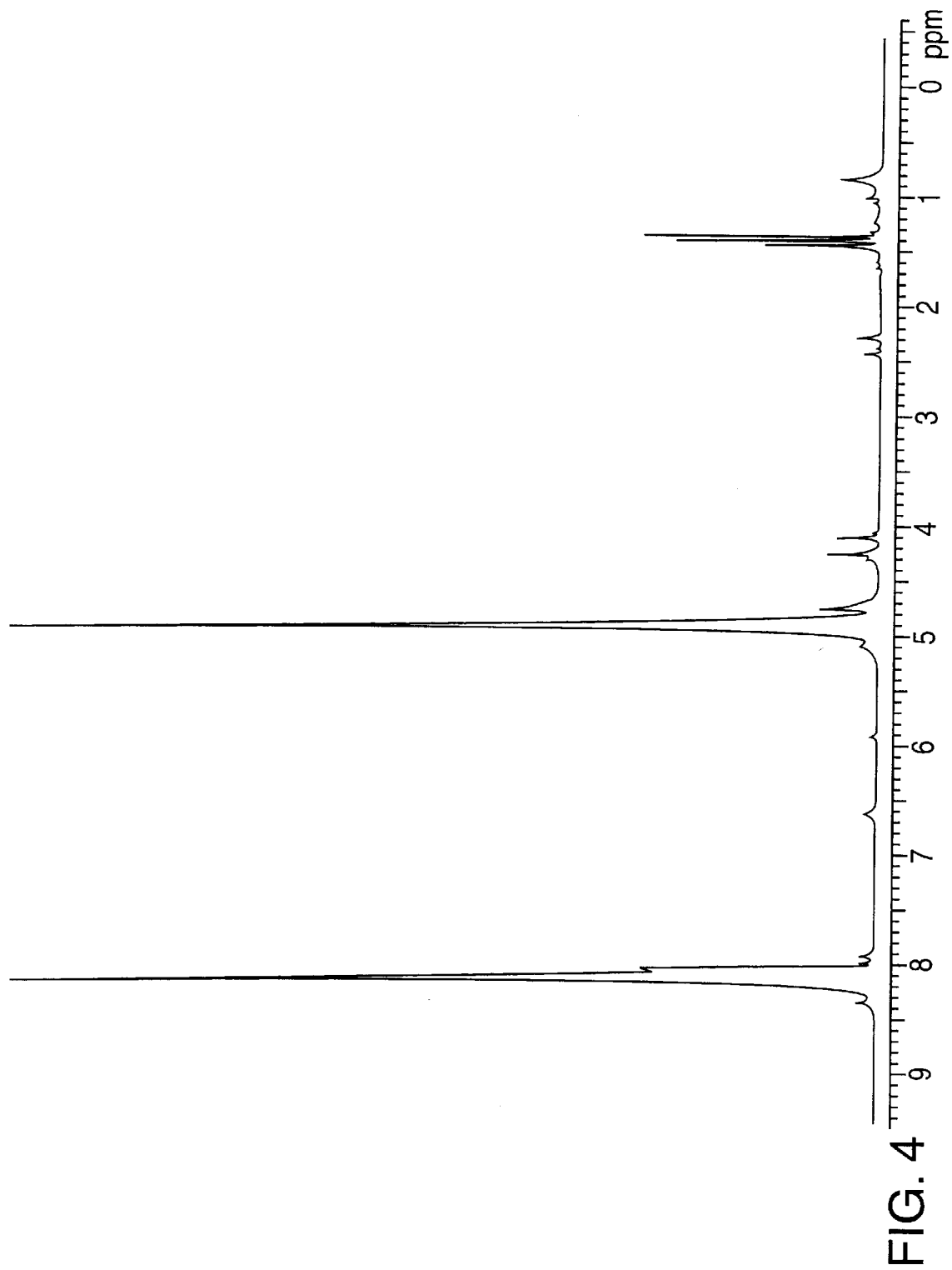
FIG. 4 illustrates the $^1$H NMR spectra of polyethylene terephthalate (IV=0.9).
Figure 5:
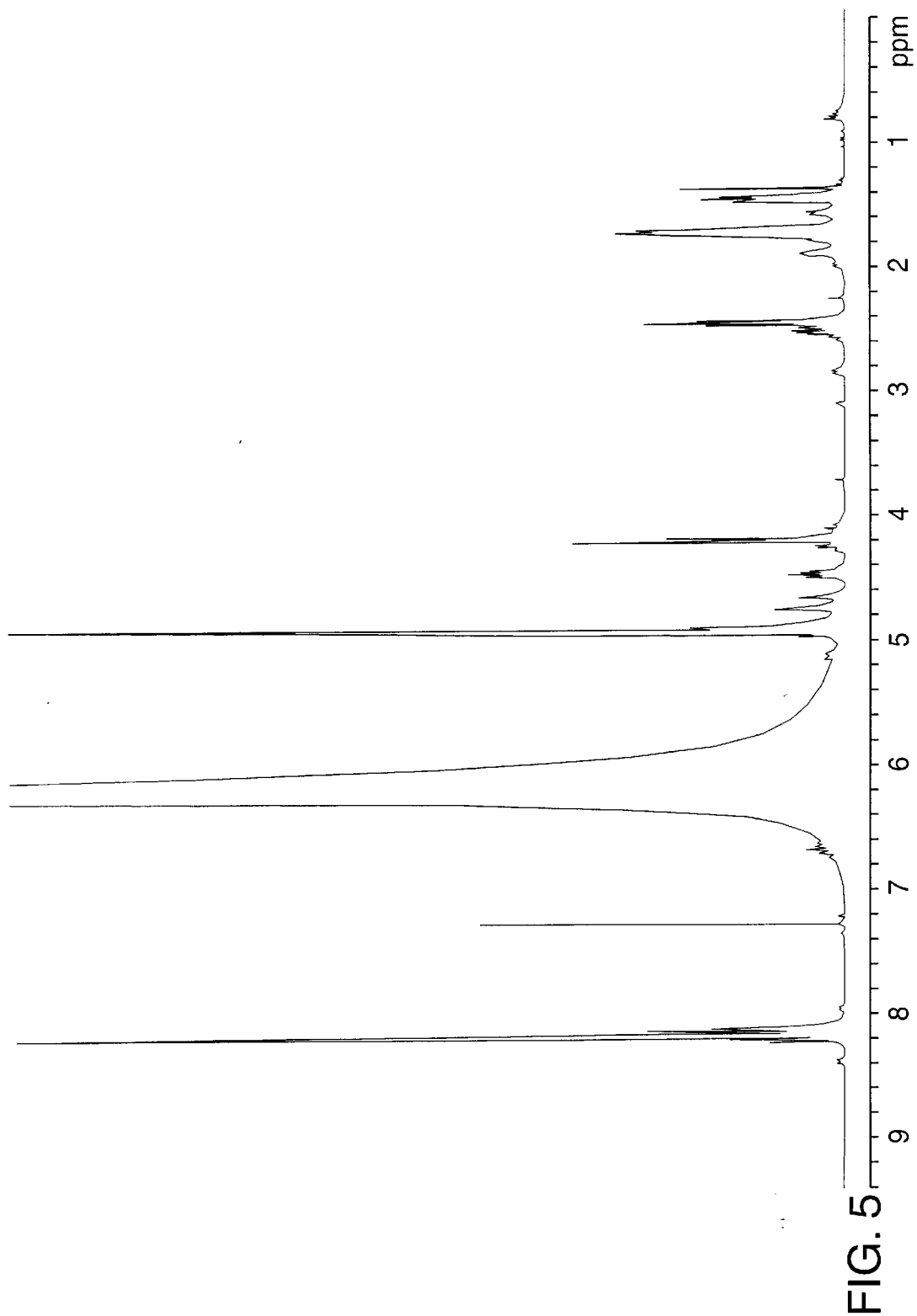
FIG. 5 illustrates the $^1$H NMR spectra of PET/polycaprolactone (25% by weight).

$^1$H NMR Spectra:

The presence of the hydroxyl end groups in the high molecular weight PET (e.g. IV=0.9) has been established by $^1$H NMR spectra and by titration of the carboxyl end groups. A chemical shift ($\delta$) at 4.10 ppm in $^1$H NMR spectra of PET (FIG. 4) is a characteristic peak of the methylene proton next to the hydroxyl end group of the PET chain. The $^1$H NMR together with the carboxyl titration show that in the case of PET (IV=0.9) at least every chain contains one hydroxyl end group. A peak at 4.24 ppm in $^1$H NMR (FIG. 5) spectra indicates the presence of polycaprolactone. Transesterification does occur in parallel to ring-opening polymerization and results in some scrambling of caprolactone units into PET block as evidenced by the presence of a peak at $\delta$=4.50 ppm in the $^1$H NMR spectra (FIG. 5) and also some PET units into the polycaprolactone block as evident by the presence of a peak at $\delta$=4.70 ppm in the $^1$H NMR spectra (FIG. 5).

Comparative Example A

Our goal was to prepare the diblock copolymer with the desired molecular weight and the desired size of the PET and polycaprolactone blocks quickly (residence time of a few minutes) in one step with complete consumption of the starting $\epsilon$-caprolactone monomer. A true mixing problem exists when using a high molecular weight aromatic polyester and water-like $\epsilon$-caprolactone monomer because a fast and complete homogenization is required. Any attempt to achieve this homogeneous mixture in a one gallon reactor proved unsuccessful even though we used various stirrers and mixing techniques. As follows, the reaction took at least 30 minutes and led to a mixture of unreacted PET and some diblock copolymers which was unacceptable for fiber spinning.

A reactor (one gallon) was preheated to 150° C. and purged with nitrogen and then 1 kg of PET pellets (IV=0.9; MV=15,000 poises at 280° C.) was added into the reactor through an opening on the top of reactor. Under the nitrogen, the pellets were heated to 290° C. and completely melted under slow agitation (30 RPM). The premixed $\epsilon$-caprolactone (333 gram) and catalyst tin octonate (0.4 gram) were injected/sprayed into the polymer melt under 100 psi nitrogen pressure. The injected monomer plasticized highly viscous melt and sharply reduced the melt viscosity of material, as noticed by the decreased torque value. The polymerization was completed at 230° C. under nitrogen within 30 minutes and the residue $\epsilon$-caprolactone was evacuated before the polymer was discharged. The discharged polymer was found not to be a homogeneous mixture. Instead of copolymer, it contained at least three components including unreacted PET melt, copolymer melt, and polycaprolactone. Thus, besides having a mixture of unreacted PET with a diblock copolymer, the diblock copolymer did not contain the desired polycaprolactone block concentration. This blend did not give the desired fiber elasticity, and therefore, a conventional reactor failed to achieve the miscibility of high IV PET and $\epsilon$-caprolactone in the preparation of resin.

The following examples are illustrative and not limiting.

Inventive Examples 1–9

The Inventive Examples illustrate the impact of catalyst concentration, polymerization temperature profile, and residence time on transesterification. For all Inventive Examples, the extruder zone temperatures, extruder screw speed, torque, polyester melt temperature and pressure, vacuum, throughput, and residence time are in Table I below. The resulting transesterification degree equals transesterified caprolactone (evidenced by $\sigma$=4.50 ppm)/[transesterified caprolactone (evidenced by $\sigma$=4.50 ppm)+polycaprolactone (evidenced by $\sigma$=4.24 ppm)]. The transesterification in the diblock copolymer as reported in Table II is calculated by multiplying the caprolactone percent in the diblock copolymer by the transesterification degree.

INVENTIVE EXAMPLE 1

Referring to FIG. 1, the dried PET pellets (IV=0.9; MV=15,000 poises at 280° C.) were fed at feed point 12 into a counter-rotation twin screw extruder 10 (diameter=27 mm; length=1404 mm) at the rate of 4.26 lbs/hr. The pellets started to melt at the first zone 14 and the second zone 16, advanced forward in the direction of arrow 18 by pumping elements 20, and was forwarded into a compressive zone at third zone 22. Seal 24 acted as a dynamic seal at the end of feeding zone and gave tight compression and reduced backflow of polymer melt. The length of each zone is about 4 times the screw diameter.

The premixed $\epsilon$-caprolactone and catalyst (tin octoate, 0.03 wt % of PET-caprolactone) were injected into the extruder by a piston pump at injection point 26 at the rate of 0.75 lb/hr. The amount of $\epsilon$-caprolactone in PET was 15 weight percent. The injected liquid was quickly mixed with PET melt back and forth by both distributive and dispersive combing mixers 28, assembled under the region of the injection port. $\epsilon$-caprolactone solubilized PET melt and reduced the melt temperature of PET to 225° C.

The mixture of PET and $\epsilon$-caprolactone was forwarded, after the fourth zone 30, into turbulator 32, advancing/ combing mixer 34, turbulator 36, advancing/combing mixer 38, turbulator 40, advancing/combing mixer 42, and turbulator 44 through zones 48 through 58. The turbulators accommodated 61% of extrusion volume between turbulators and barrel. The total volume of extrusion and throughput rate (5.01 /hr) dictated the residence time of about 12 minutes. The melt in the process of polymerization was under the continuous agitation of intermeshing turbulators and homogenization of advancing/combing mixers 34, 38, and 42.

By the end of polymerization, the PET-polycaprolactone copolymer melt was fed into devolatilizing zone 60 under the vacuum (−750 mbar). The residual unreacted ε-caprolactone (0.05%) was so minimal that it was not removed from the melt. The polymer (PET(85%)-polycaprolactone(15%)) was then extruded through a three hole die, quenched into water, and cut into pellets. The diblock copolymer had a melting point of 227° C. and an IV=0.94 which demonstrates that the PET copolymerized with ε-caprolactone.

INVENTIVE EXAMPLE 2

The dried PET pellets (IV=0.9; MV=15,000 poises at 280° C.) were at feed point 12 into the twin screw extruder 10 of FIG. 1 at the rate of 7.7 lbs/hr. After melting of PET at zones 14 and 16, the premixed ε-caprolactone and catalyst (tin octoate, 0.03 wt % of PET-caprolactone) were injected at injection point 26 into the melt at the rate of 2.7 lbs/hr. The amount of ε-caprolactone in PET was 26 weight percent. Under the same extrusion profile as in Inventive Example 1 above, an increase of throughput rate (10.4 lbs/hr) gave an average residence time of 6 minutes. After devolatilizing at zone 60, the polymer (PET(74%)-polycaprolactone(26%)) was extruded through a three hole die, quenched into water, and cut into pellets. The diblock copolymer had a melting point of 219° C. and an IV=0.97 which demonstrates that the PET copolymerized with ε-caprolactone and transesterification is reported in Table II below.

INVENTIVE EXAMPLES 3 AND 4

The dried PET pellets (IV=0.9; MV=15,000 poises at 280° C.) were fed at feed point 72 into a twin screw extruder 70 (diameter=27 mm) of FIG. 2 at the rate of 7.7 lbs/hr. The pellets started to melt at the first zone 74 and the second zone 76, advanced forward in the direction of arrow 78, and was forwarded by pumping elements 80 in the third zone 82. The length of each zone is about 4 times the screw diameter. Seal 84 acted as a dynamic seal at the end of feeding zone and gave tight compression and reduced backflow of polymer melt. After melting of PET, the premixed ε-caprolactone and catalyst (tin octoate, 0.03 wt % of PET-caprolactone) were injected at injection point 86 into the melt at the rate of 2.4 lbs/hr. A neutral mixer 88 was used to provide the same distributive and dispersive mixing effect as in the profile of FIG. 1 but tightened residence time distribution and reduced shear. The melt proceeded over turbulator 90, neutral mixer 92, and turbulator 94 through zones 96 through 110 and was devolatilized at 112. The amount of ε-caprolactone in PET was 24 weight percent. With the same screw design and temperature profile, the screw at speeds of 150 RPM for Inventive Example 3 and 120 RPM for Inventive Example 4, gave an average residence time of 5 minutes and generated samples of PET(76%)/polycaprolactone(24%) with 1 and 1.5 minutes residence time distribution, respectively. Inventive Example 3 had a diblock copolymer with a melting point of 225° C.and an IV=1 and Inventive Example 4 had a diblock copolymer with a melting point of 223° C. and an IV=0.97 which demonstrates that the PET copolymerized with ε-caprolactone.

INVENTIVE EXAMPLE 5

Referring to FIG. 2, the dried PET pellets (IV=0.9; MV=15,000 poises at 280° C.) were fed into a twin screw extruder 70 at the rate of 7.7 lbs/hr. After melting of PET, the premixed ε-caprolactone and catalyst (tin octoate, 0.03 wt % of PET-caprolactone) were injected at injection point 86 into the melt at the rate of 2.4 lbs/hr. The amount of ε-caprolactone in PET was 24 weight percent. With the same screw design and speed as in Inventive Example 3 above, the reaction was completed at lower zone temperatures as indicated in Table I below. The diblock copolymer had a melting point of 224° C. and an IV=1.02 which demonstrates that the PET copolymerized with ε-caprolactone.

INVENTIVE EXAMPLES 6 AND 7

Referring to FIG. 2, the dried PET pellets (IV=0.9; MV=15,000 poises at 280° C.) were fed into a twin screw extruder 70 at the rate of 7.7 lbs/hr. After melting of PET, the premixed ε-caprolactone and catalyst (tin octoate, 0.01 wt % of PET-caprolactone for Inventive Example 6 and 0.09 wt % of PET-caprolactone for Inventive Example 7) were injected at injection point 86 into the melt at the rate of 2.4 lbs/hr. The amount of ε-caprolactone in PET was 24 weight percent. With the same extrusion profile as in Inventive Example 5 above, the polymer samples prepared with the above mentioned catalyst concentrations were collected. Inventive Example 6 had a diblock copolymer with a melting point of 222° C. and IV=0.97 and Inventive Example 7 had a diblock copolymer with a melting point of 228° C. and IV=0.97 which demonstrates that the PET copolymerized with ε-caprolactone.

INVENTIVE EXAMPLE 8

Referring to FIG. 2, the dried PET pellets (IV=0.9; MV=15,000 poises at 280° C.) were fed into a twin screw extruder 70 at the rate of 10.5 lbs/hr. After melting of PET, the premixed ε-caprolactone and catalyst (tin octoate, 0.09 wt % of PET-caprolactone) were injected at injection point 86 into the melt at the rate of 3.5 lbs/hr. The amount of ε-caprolactone in PET was 25 weight percent. Under the same extrusion profile as in Inventive Example 7 above, the reaction was completed with residence time of 4 minutes and distribution time of 1 minute. The diblock copolymer had a melting point of 230° C. and IV=0.99 which demonstrates that the PET copolymerized with ε-caprolactone.

INVENTIVE EXAMPLE 9

The design of FIG. 3 is the most preferred because forwarding mixers are present under the injection region to reduce pressure, more neutral mixers are present in the zone reaction, and sufficient forward pumping occurs in the reaction zone. Referring to FIG. 3, the dried PET pellets (IV=0.9; MV=15,000 poises at 280° C.) were fed at feed point 122 into a twin screw extruder 120 at the rate of 12 lbs/hr. The length of one zone is about 4 times the screw diameter. The pellets started to melt at first zone 124 and second zone 126 and advanced forward in direction of arrow 128 by pumping element 130 into third zone 132. After melting of PET, the premixed ε-caprolactone and catalyst (tin octonate, 0.09 wt % of PET-caprolactone) were injected into the extruder at injection point 134 into the melt at the rate of 4 lbs/hr. A forwarding mixer 136 was located under the injection point 134. The melt advanced at zone 138 contacting turbulator 140, neutral mixer 142, turbulator 144, neutral mixer 146, turbulator 148, neutral mixer 150, turbulator 152, and neutral mixer 154 through zones 156 through 168. The amount of ε-caprolactone in PET was 25 weight percent. The melt was devolatilized at 170. Very minute amount of ε-caprolactone was collected after a period of 10 hours of continuous operation. Under the modified extrusion profile from Inventive Example 8 above, the reaction was completed with residence time of 3.7 minutes and distribution of 1 minute. The polymer melt (PET(75%)-polycaprolactone(25%)) was then either fed into a spin pot which contained a spinnerette to form fibers, or extruded through a three hole die, quenched into water, and cut into pellets. The diblock copolymer had a melting point of 231° C. and an IV=0.98 which demonstrates that the PET copolymerized with ε-caprolactone.

Inventive Examples 1–9 (Table II) were prepared under different polymerization residence time, polymerization temperatures, catalyst concentrations, screw mixing elements, and screw speeds. The resulting diblock copolymer has increased intrinsic viscosity relative to the starting PET showed that ring opening polymerization had occurred within these residence times and had increased the polymer's molecular weight. Under the screw speed (150RPM), the extrusion profile gave a narrow residence time distribution of 1 minute. With catalyst concentration (0.09 wt % of polymer) and barrel temperature as indicated in Table I, the residence time of Inventive Example 9 was reduced to 3.7 minutes with a throughput rate of 16 lbs/hr. It gave a complete ring-opening polymerization and minimized the transesterification. Less than 5% transesterification occurred.

Fiber Production:

The polymer pellets as produced in Inventive Example 9 (Table I) were fed into a 1" MPM single screw extruder

TABLE I

| Inventive Ex. | Zone 14 | Zone 16 | Zone 22 | Zone 30 | Zone 46 | Zone 48 | Zone 50 | Zone 52 | Zone 54 | Zone 56 | Zone 58 | Zone 62 | Zone 64 |
|---|---|---|---|---|---|---|---|---|---|---|---|---|---|
| 1 | 292 | 290 | 260 | 250 | 250 | 245 | 245 | 240 | 240 | 240 | 252 | 242 | 240 |
| 2 | 289 | 290 | 260 | 250 | 239 | 245 | 245 | 240 | 240 | 242 | 240 | 243 | 240 |
| | Zone 74 | Zone 76 | Zone 82 | Zone 96 | Zone 98 | Zone 100 | Zone 102 | Zone 104 | Zone 106 | Zone 108 | Zone 110 | Zone 114 | Zone 116 |
| 3 | 290 | 290 | 260 | 260 | 245 | 245 | 245 | 240 | 240 | 240 | 240 | 240 | 240 |
| 4 | 290 | 290 | 260 | 260 | 245 | 245 | 245 | 240 | 240 | 240 | 239 | 240 | 240 |
| 5 | 292 | 287 | 255 | 255 | 242 | 240 | 240 | 235 | 235 | 235 | 235 | 235 | 235 |
| 6 | 292 | 290 | 255 | 255 | 242 | 240 | 240 | 235 | 235 | 235 | 235 | 236 | 235 |
| 7 | 292 | 290 | 255 | 255 | 243 | 240 | 240 | 235 | 235 | 235 | 235 | 235 | 235 |
| 8 | 289 | 290 | 255 | 255 | 242 | 240 | 240 | 235 | 235 | 236 | 235 | 238 | 235 |
| | Zone 124 | Zone 126 | Zone 132 | Zone 138 | Zone 156 | Zone 158 | Zone 160 | Zone 162 | Zone 164 | Zone 166 | Zone 168 | Zone 172 | Zone 174 |
| 9 | 292 | 290 | 255 | 255 | 245 | 240 | 240 | 235 | 235 | 235 | 235 | 235 | 235 |

| Screw Speed (RPM) | Torque | Melt Temperature | Melt Pressure(psi) | Vacuum(mbar) | Throughput (lbs/hr) | Residence Time (min) | Residence Time Distribution (min) |
|---|---|---|---|---|---|---|---|
| 150 | 55 | 264 | 90 | −750 | 5 | 12 | Not determined |
| 150 | 47 | 254 | 60 | −750 | 10 | 6 | 2 |
| 150 | 41 | 258 | 10 | −850 | 10 | 6 | 1 |
| 120 | 43 | 258 | 10 | −850 | 10 | 6 | 1.5 |
| 150 | 50 | 255 | 10 | −850 | 10 | 6 | 1 |
| 150 | 46 | 254 | 10 | −850 | 10 | 6 | 1 |
| 150 | 43 | 255 | 10 | −850 | 10 | 6 | 1 |
| 150 | 51 | 255 | 0 | −850 | 14 | 4 | 1 |
| 150 | 48 | 256 | 60 | −1000 | 16 | 3.7 | 1 |

Zone temperature had negligible deviation from set points.
The unit for each zone and melt temperature is °C.

TABLE II

| Inventive Example | ε-Caprolactone (%) | Unreacted ε-Caprolactone (%) | Diblock Copolymer Intrinsic Viscosity (dl/g) | Transesterification in Diblock Copolymer (%) |
|---|---|---|---|---|
| 1 | 15 | 0 | 0.94 | 6 |
| 2 | 26 | 2.7 | 0.97 | 7 |
| 3 | 24 | 2.8 | 1 | 6 |
| 4 | 24 | 3.3 | 0.97 | 6 |
| 5 | 24 | 3.1 | 1.02 | 6 |
| 6 | 24 | 11 | 0.97 | 7 |
| 7 | 24 | 0 | 0.97 | 5 |
| 8 | 25 | 1 | 0.99 | 5 |
| 9 | 25 | 0 | 0.98 | 5 |

(L/D=30:1), equipped with a screw of having a long metering zone to stabilize melt pressure at the end of extruder. A reverse temperature profile was selected with a purpose to melt the pellets completely at first and second zones, then decrease the melt temperature in zone 4 and block, and increase the melt viscosity before pumping into a spin pot. The spin pot contained a screen pack and a round spinnerette with 25 holes (0.024"×0.072"). The extrudated filaments went through a heated sleeve and were quenched by ambient air in a 5 meter stack. The yarn was then coated with a spin finish in the spinning line and taken by a godet at a certain speed to form a package.

The as spun yarn was then fully drawn under different conditions to its maximum draw ratio. The fully drawn yarn was then relaxed to produce fiber with the desired stress-strain curve.

INVENTIVE EXAMPLE 10

The polymer pellets (Inventive Example 9, PET/25% polycaprolactone) were dried and fed into the single screw extruder with the temperature profile indicated in Table III at the screw speed 48 RPM. After extrusion conditions reached its equilibrium with a throughput rate of 50 g/min (2 g/hole/min), the barrel pressure and spin pot pressure reached 1250 psi and 800 psi, respectively The as spun yarn was 1680 denier with birefringence (n=0.00028). Then, the yarn was drawn under conditions 1a and 1b in Table IV and gave the tenacity of 6.1 and 7.1 g/denier, respectively. The fully drawn yarn 1a was 224 denier with melting temperature at 223° C. X-ray diffraction pattern showed the crystalline index of fiber 29% and the crystallite orientation 0.98. The fully drawn yarn 1b was 203 denier with melting temperature at 225° C. X-ray diffraction pattern showed the crystalline index of fiber 27% and the crystallite orientation 0.98. The crystallite size of 1b was smaller that that of 1a, giving enhanced structural connectivity.

INVENTIVE EXAMPLE 11

The polymer pellets (Inventive Example 9, PET/25% Polycaprolactone) were dried and fed into the extruder with the temperature profile indicated in Table III at the screw speed of 47 RPM. The extrusion conditions gave barrel pressure and spin pot pressure, 1200 psi and 440 psi, respectively. The as spun yarn was 1660 denier with birefringence (n=0.00012). Then, the yarn was drawn under condition 2 in Table IV and gave the tenacity of 7.7 g/denier. The fully drawn yarn was 191 denier with melting temperature at 225° C. X-ray diffraction patent showed the crystalline index 30% and the crystallite orientation 0.98.

INVENTIVE EXAMPLE 12

The polymer pellets (Inventive Example 9, PET/25% Polycaprolactone) were dried and fed into the extruder with the temperature profile indicated in Table IIlI at the screw speed 46 RPM. The extrusion conditions gave barrel pressure and spin pot pressure, 1200 psi and 500 psi, respectively. The as spun yarn was 1650 denier with birefringence (n=0.00015). Then, the yarn was drawn under condition 3 in Table IV and gave the tenacity of 7.8 g/denier. The fully drawn yarn was 200 denier with melting temperature at 224° C. X-ray diffraction showed the crystalline index 30% and the crystallite orientation 0.98.

INVENTIVE EXAMPLE 13

Figure 6:
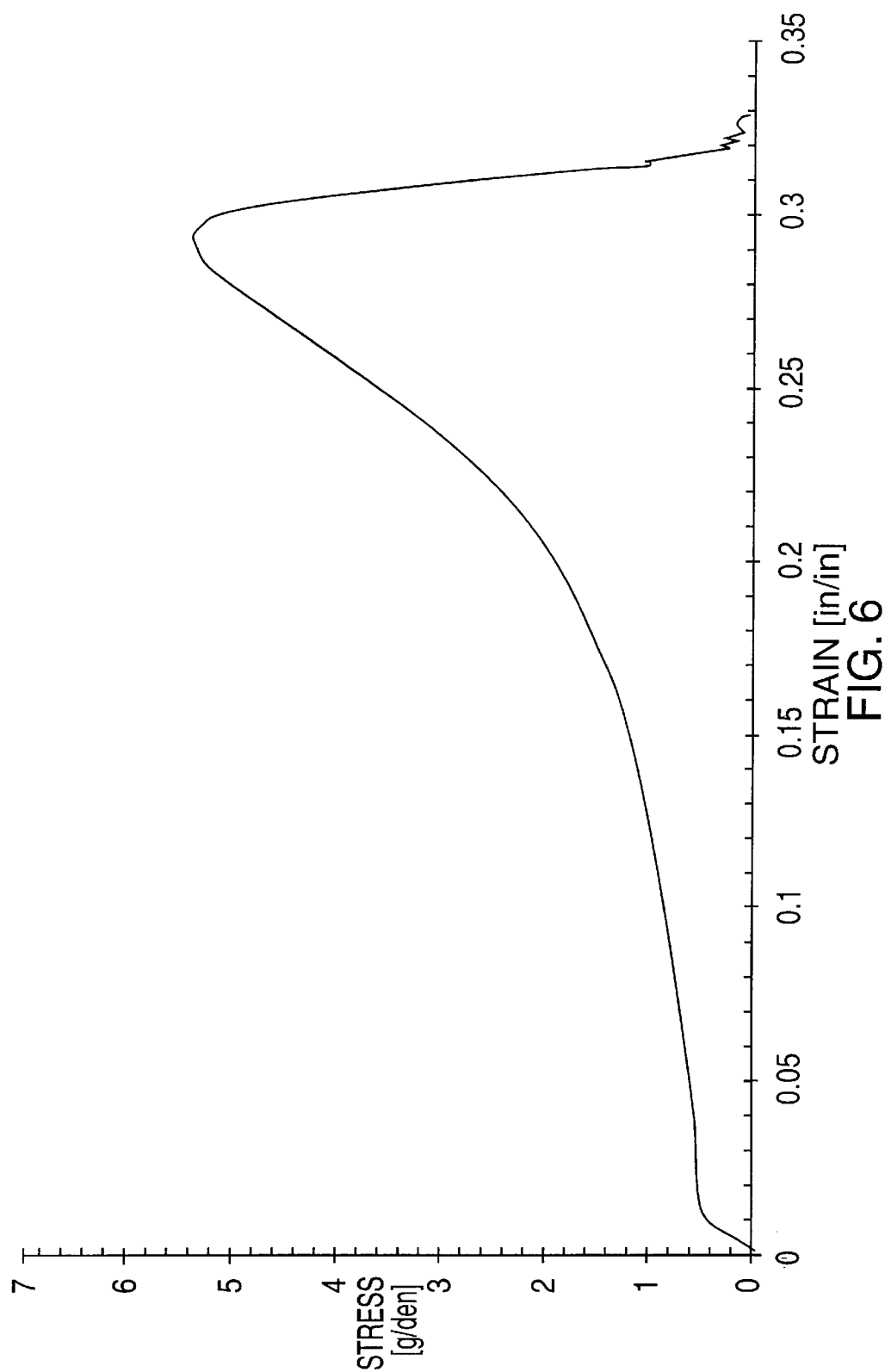
FIGS. 6–8 illustrate stress-strain curves for fibers made from the present diblock copolymers.

The above fully drawn fiber (Inventive Example 12) was fed at a speed of 300 m/min onto the first roll at room temperature, then fed onto the second roll at 135° C. with 1 second contact time and shrunk 15%, quenched on a room temperature roll, and sent to a winder. The stress-strain curve is shown in FIG. 6.

INVENTIVE EXAMPLE 14

The polymer pellets (Inventive Example 1, PET/15% Polycaprolactone) were dried and fed into the extruder with the temperature profile indicated in Table III at the screw speed 40 RPM. The extrusion conditions gave barrel pressure and spin pot pressure, 800 psi and 400 psi, respectively.

TABLE III

| Example | Zone 1 (°C.) | Extruder Zone 2 (°C.) | Zone 3 (°C.) | Zone 4 (°C.) | Block (°C.) | Spin (°C.) | Throughput rate (g/min/hole) | Sleeve Temp (°C.) | Take up speed (m/min) |
|---|---|---|---|---|---|---|---|---|---|
| 10 | 277 | 277 | 277 | 270 | 240 | 240 | 2 | 185 | 280 |
| 11 | 277 | 277 | 277 | 270 | 260 | 260 | 2 | 235 | 280 |
| 12 | 277 | 277 | 277 | 270 | 260 | 260 | 2 | 185 | 280 |
| 14 | 304 | 293 | 293 | 288 | 271 | 271 | 1.6 | 200 | 180 |
| 15 | 260 | 260 | 260 | 254 | 250 | 260 | 1.6 | 200 | 180 |

TABLE IV

| Example | 1st Roll Temp (°C.) | wraps | Shoe Temp (°C.) | 2nd Roll Temp (°C.) | wraps | Draw Ratio | Crystallite Size (Å) (010) | (110) | (100) |
|---|---|---|---|---|---|---|---|---|---|
| 1a | 30 | 9 | 170 | 180 | 10 | 7.8 | 67 | 59 | 43 |
| 1b | 40 | 7 | 140 | 140 | 10 | 8.2 | 52 | 52 | 33 |
| 2 | 30 | 7 | 140 | 140 | 10 | 8.4 | 52 | 52 | 34 |
| 3 | 40 | 7 | 140 | 140 | 10 | 8.4 | 52 | 52 | 33 |
| 4 | 40 | 7 | 150 | 90 | 10 | 7.7 | N/A | | |
| 5 | 30 | 7 | 160 | 160 | 10 | 7.4 | N/A | | |

Figure 7:
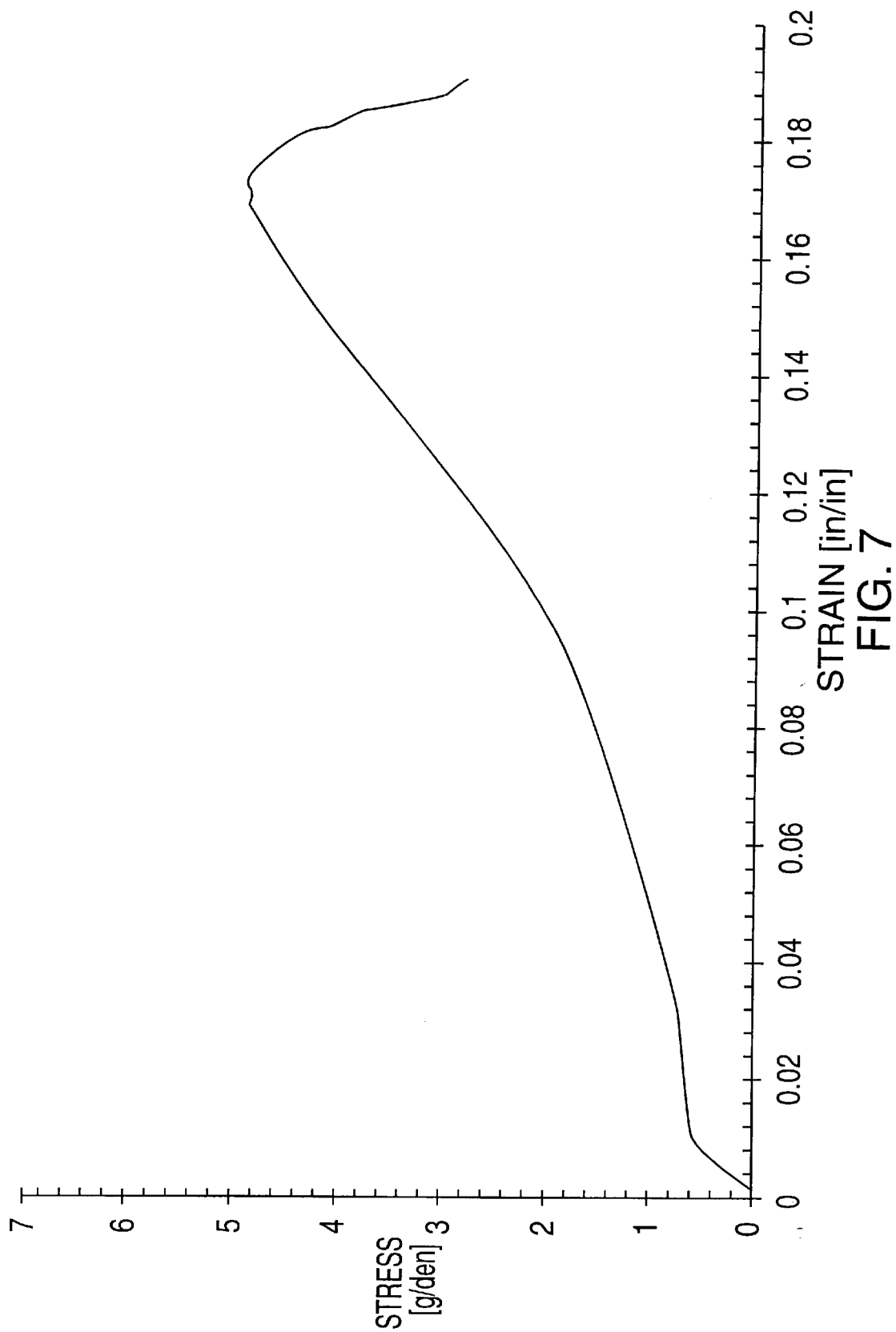

The as-spun yarn was then drawn under condition 4 in Table IV and gave a fiber with tenacity of 6.5 g/denier. The fully drawn yarn was 259 denier with melting temperature at 220° C. The above fully drawn fiber was fed at the speed of 300 m/min onto the first roll at room temperature, then fed onto the second roll at 150° C. with 1 second contact time and shrunk 10%, quenched on a room temperature roll, and sent to a winder. See stress-strain curve in FIG. 7.

INVENTIVE EXAMPLE 15

Figure 8:
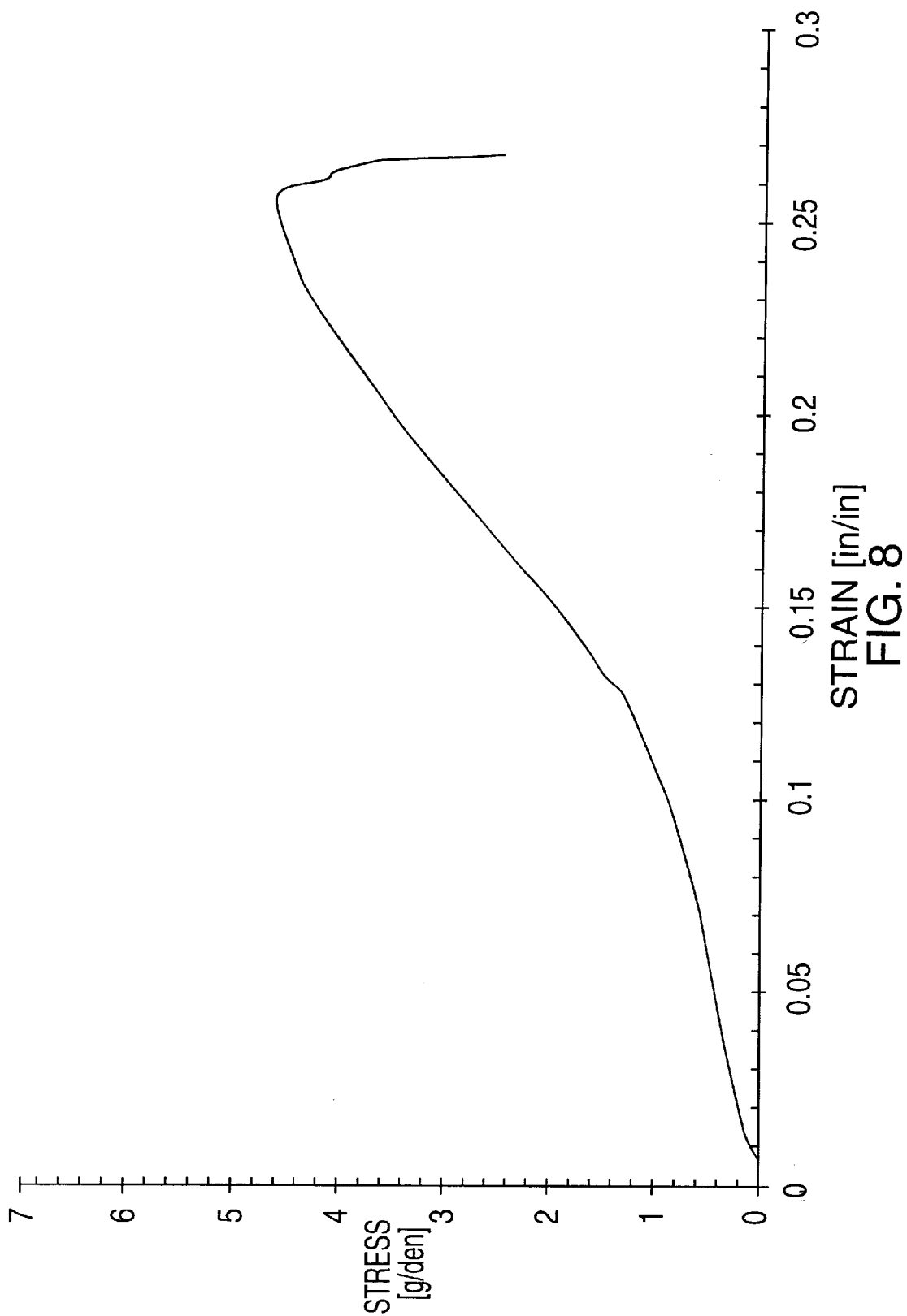

A diblock polymer (PET(70%)-polycaprolactone(30%)) was prepared in a manner similar to that set forth above. The polymer pellets (PET/30% Polycaprolactone) were dried and fed into the extruder with the temperature profile indicated in Table III at the screw speed of 42 RPM. The extrusion conditions gave barrel pressure and spin pot pressure, 900 psi and 500 psi, respectively. The as-spun yarn was then drawn under condition 5 in Table IV and gave the fiber with tenacity of 5.9 g/denier. The fully drawn yarn was 271 denier with melting temperature at 220° C. The above fully drawn fiber was fed at the speed of 300 m/min onto the first roll at room temperature, then fed onto the second roll at 150° C. with 1 second contact time and shrunk 10%, quenched on a room temperature roll, and sent to a winder. See stress-strain curve of FIG. 8.

What is claimed is:

1. A diblock copolymer comprising:
   (a) a first block of polyester wherein said first block is made from an aromatic polyester having: (i) an intrinsic viscosity which is measured in a 60/40 by weight mixture of phenol and tetrachloroethane and is at least about 0.8 deciliter/gram and (ii) a Newtonian melt viscosity which is measured by capillary rheometer and is at least about 7,000 poise at 280° C.; and
   (b) a second block of polyester wherein said second block is made from lactone monomer, wherein said aromatic polyester is in an amount of about 50 to about 99 weight percent and said lactone monomer is in an amount of about 1 to about 50 weight percent based on the diblock copolymer weight and said diblock copolymer has a melting point of at least about 230° C.

2. The diblock copolymer of claim 1 wherein said aromatic polyester is selected from the group consisting of poly(ethylene terephthalate); poly(ethylene naphthalate); poly(alkylene naphthalates); and poly(cycloalkylene naphthalates).

3. The diblock copolymer of claim 1 wherein said aromatic polyester is selected from the group consisting of poly(ethylene terephthalate).

4. The diblock copolymer of claim 1 wherein said aromatic polyester is selected from the group consisting of poly(ethylene naphthalate).

5. The diblock copolymer of claim 3 wherein said first block is made from aromatic polyester having an intrinsic viscosity of at least about 0.9 deciliter/gram.

6. The diblock copolymer of claim 3 wherein said first block is made from aromatic polyester having a Newtonian melt viscosity of at least about 10,000 poises at 280° C.

7. The diblock copolymer of claim 4 wherein said first block is made from aromatic polyester having a Newtonian melt viscosity of at least about 15,000 poises at 280° C.

8. The diblock copolymer of claim 1 wherein said lactone polymer is made from monomer selected from the group consisting of ε-caprolactone, propiolactone, butyrolactone, and valerolactone.

9. A fiber formed from by spinning, drawing, and relaxing the diblock copolymer of claim 1.

10. A webbing formed from the fiber of claim 9.

11. A seat belt formed from the webbing of claim 10.

12. A process for forming a diblock copolymer comprising:
   (a) a first block of polyester wherein said first block is made from aromatic polyester having: (i) an intrinsic viscosity which is measured in a 60/40 by weight mixture of phenol and tetrachloroethane and is at least about 0.8 deciliter/gram and (ii) a Newtonian melt viscosity which is measured by capillary rheometer and is at least about 7,000 poise at 280° C.; and (b) a second block of polyester where said second block is made from lactone monomer,
   wherein the process comprises the steps of:
      (A) in a twin screw extruder, injecting said lactone monomer into said aromatic polyester which is melted; and
      (B) mixing said melted aromatic polyester and said lactone monomer at a residence time of less than about 30 minutes and at a temperature sufficient to form said diblock copolymer,
   wherein the amount of transesterification is less than about 5 percent by weight based on said diblock copolymer weight and said diblock copolymer has a melting point of at least about 230° C.

13. The process of claim 12 comprising the additional step of:
   (D) spinning said diblock copolymer into fiber.

14. The process of claim 12 wherein said residence time is less than about 15 minutes.

15. The process of claim 12 wherein said residence time is less than about 10 minutes.

16. The process of claim 12 wherein said residence time is less than about 5 minutes.

17. The process of claim 12 wherein the aromatic polyester is melted in said extruder.

18. The diblock copolymer of claim 1 wherein said aromatic polyester is in an amount of about 65 to about 85 weight percent and said lactone monomer is in an amount of about 15 to about 35 weight percent.

* * * * *